Figure 13:
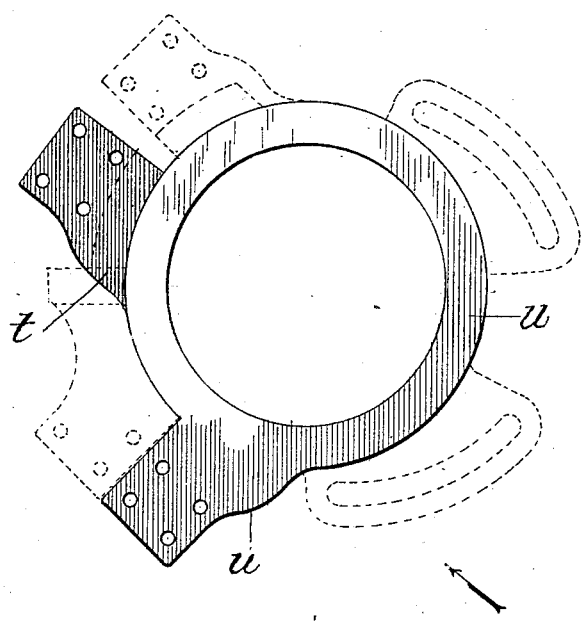

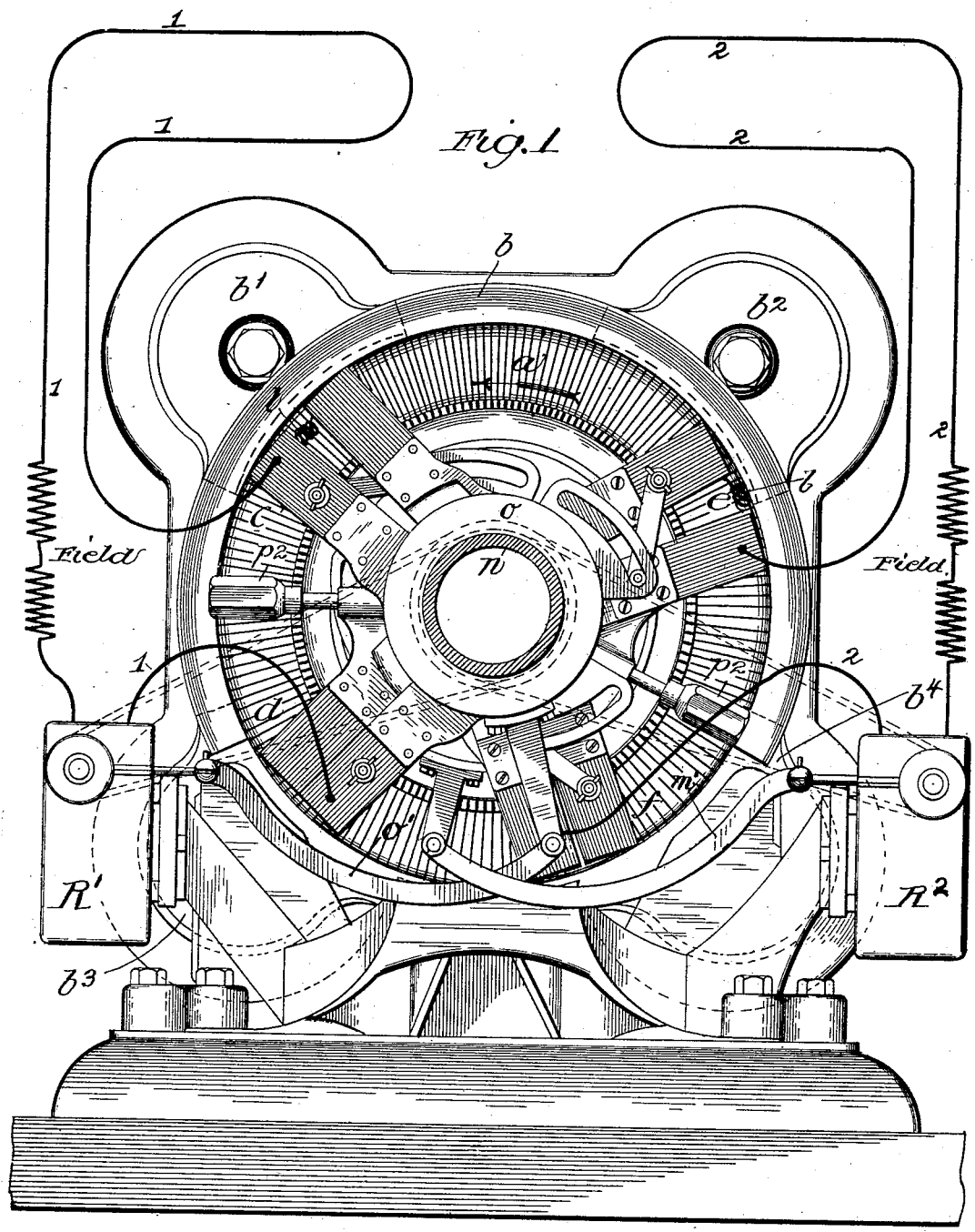

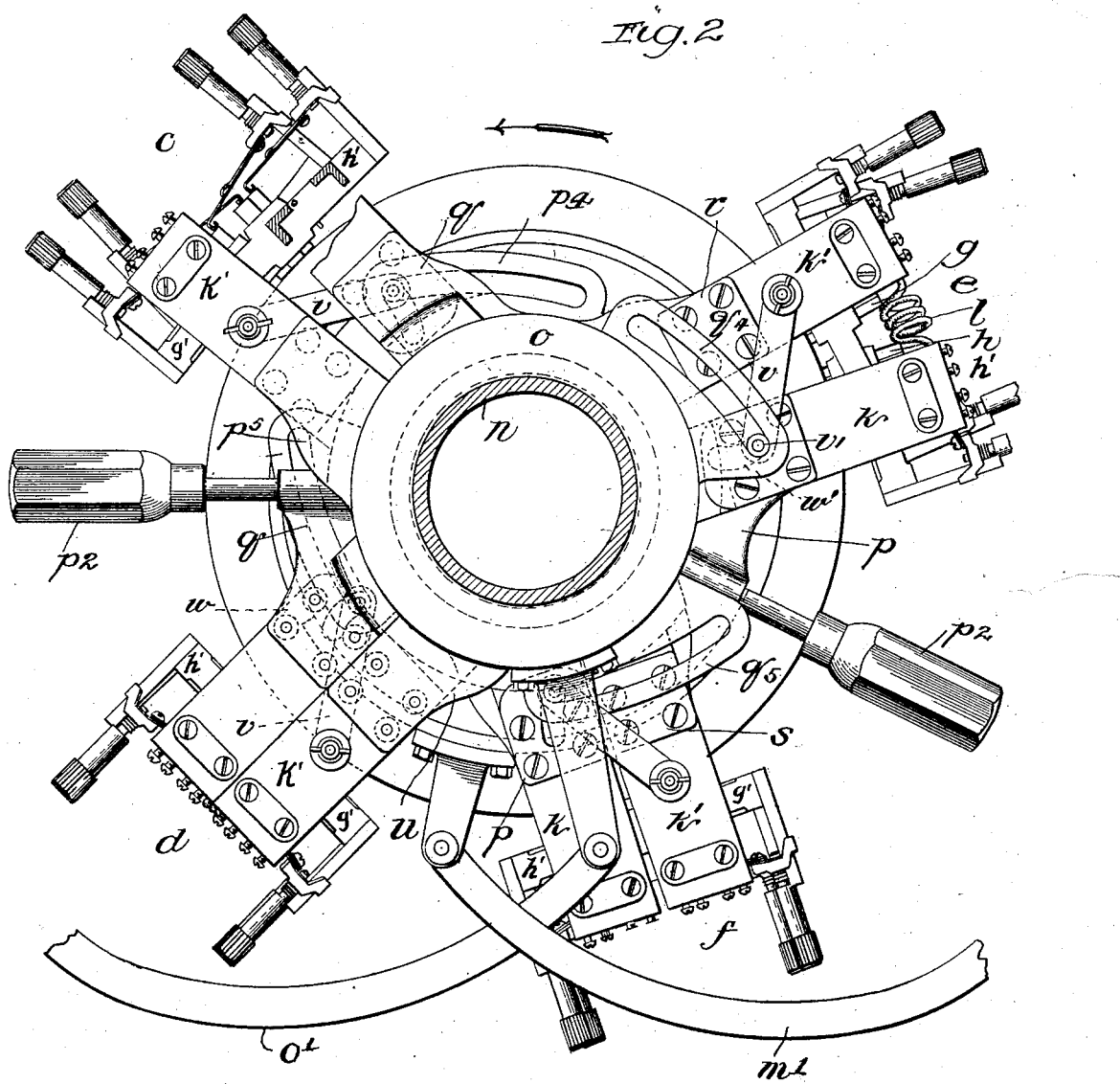

No. 716,356. Patented Dec. 16, 1902.
H. H. WAIT.
REGULATING MECHANISM FOR MULTICIRCUIT GENERATORS.
(Application filed May 5, 1902.)
(No Model.) 6 Sheets—Sheet 3.
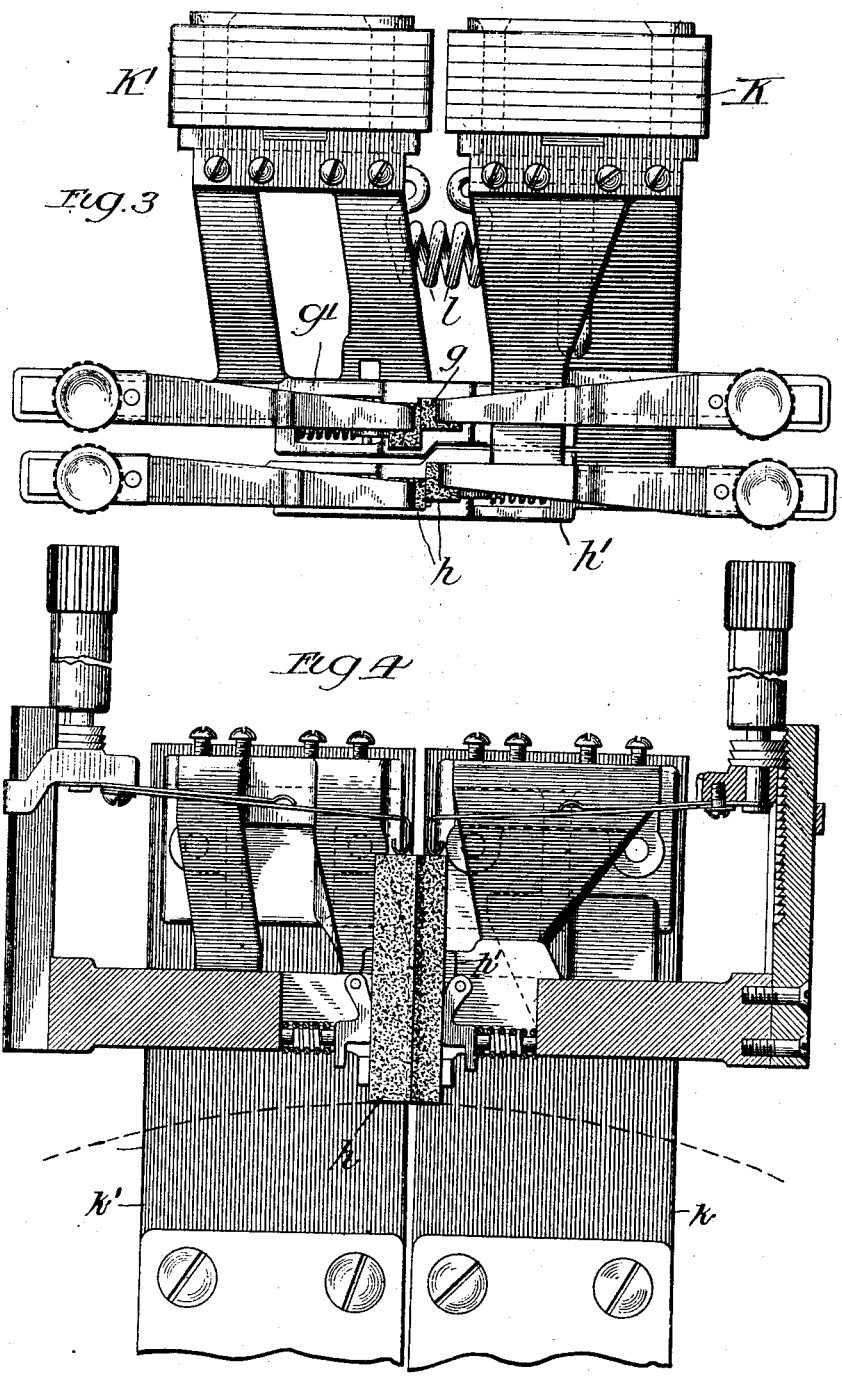

No. 716,356. Patented Dec. 16, 1902.
H. H. WAIT.
REGULATING MECHANISM FOR MULTICIRCUIT GENERATORS.
(Application filed May 5, 1902.)
(No Model.) 6 Sheets—Sheet 4.
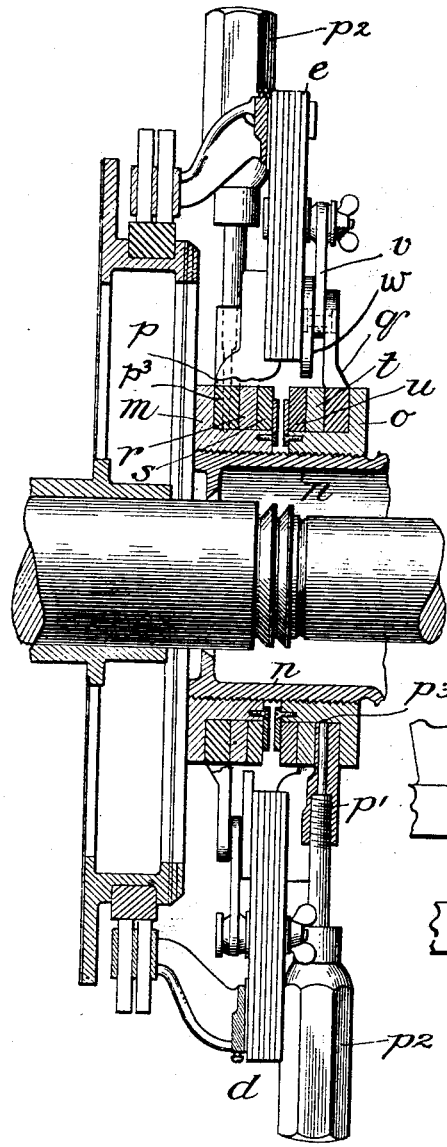
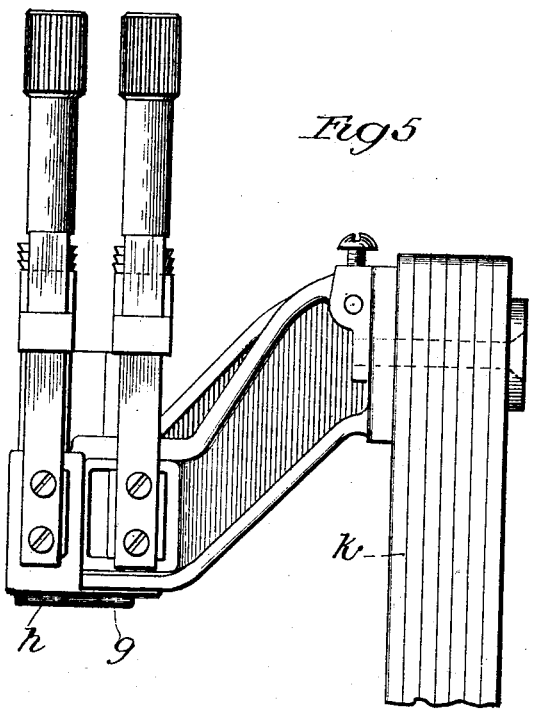
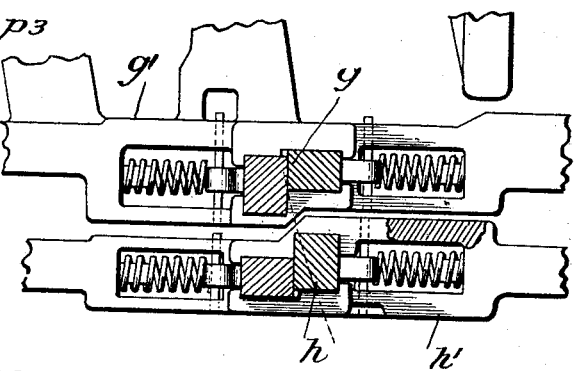
Witnesses
Harold G. Barritt
W. W. Leach
Inventor
Henry H. Wait.
By George P. Barton
Atty.

No. 716,356. Patented Dec. 16, 1902.
H. H. WAIT.
REGULATING MECHANISM FOR MULTICIRCUIT GENERATORS.
(Application filed May 5, 1902.)
(No Model.) 6 Sheets—Sheet 5.
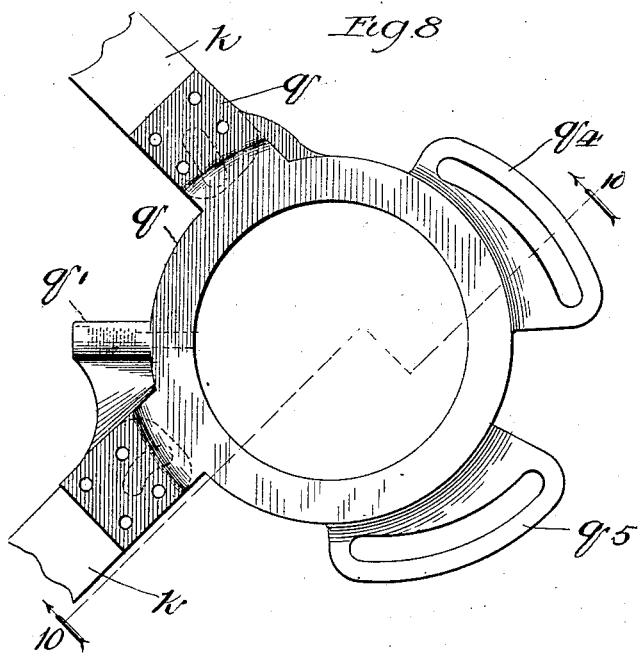
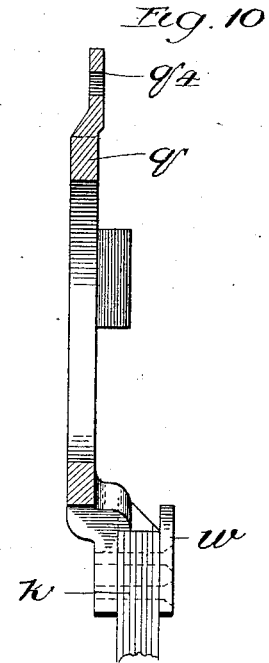
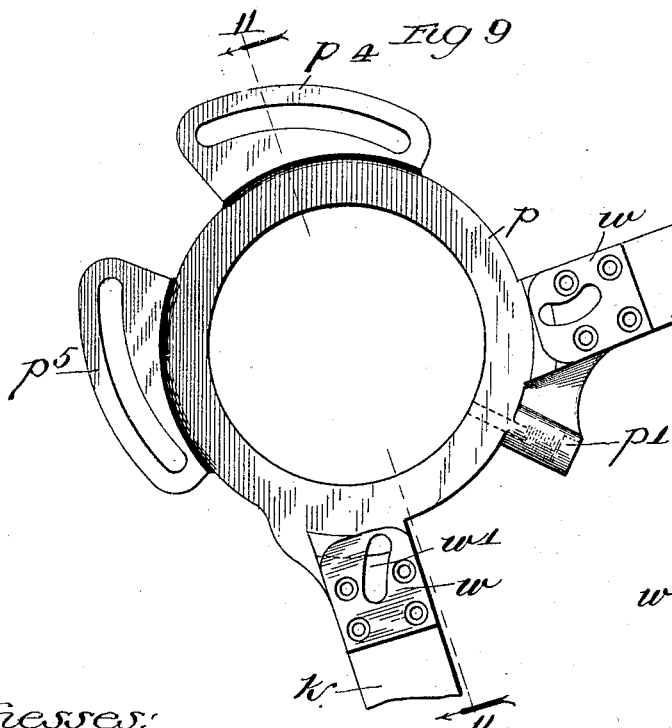
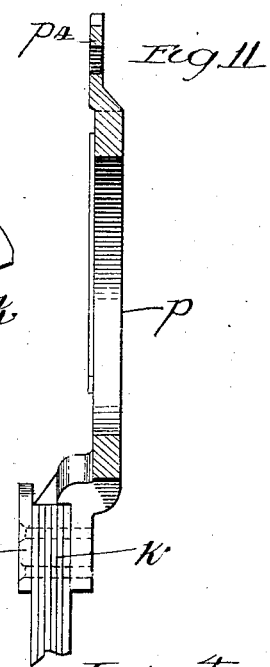
Witnesses:
Harold G. Barrett
W. N. Leach
Inventor
Henry H. Wait.
By George P. Barton
Atty.

No. 716,356. Patented Dec. 16, 1902.
H. H. WAIT.
REGULATING MECHANISM FOR MULTICIRCUIT GENERATORS.
(Application filed May 5, 1902.)
(No Model.) 6 Sheets—Sheet 6.

Witnesses:
Harold G. Barrett
W. W. Leach

Inventor:
Henry H. Wait
By Severn P. Borton
Atty

UNITED STATES PATENT OFFICE.

HENRY H. WAIT, OF CHICAGO, ILLINOIS, ASSIGNOR TO WESTERN ELECTRIC COMPANY, OF CHICAGO, ILLINOIS, A CORPORATION OF ILLINOIS.

REGULATING MECHANISM FOR MULTICIRCUIT-GENERATORS.

SPECIFICATION forming part of Letters Patent No. 716,356, dated December 16, 1902.

Application filed May 5, 1902. Serial No. 105,940. (No model.)

*To all whom it may concern:*

Be it known that I, HENRY H. WAIT, a citizen of the United States, residing at Chicago, in the county of Cook and State of Illinois, have invented a certain new and useful Improvement in Regulating Mechanism for Multicircuit-Generators, (Case No. 18,) of which the following is a full, clear, concise, and exact description.

My invention relates to regulating mechanism for electric generators of the multicircuit type—that is, where two or more individual working circuits, such as series arc-lamp circuits, are fed from different sets of brushes which take current from the same armature.

It will be seen that in an arc-machine where the armature necessarily has a very high reaction a movement of the brushes supplying one circuit to compensate for a change of load on that circuit will change the circumferential distance on the commutator between these brushes and brushes belonging to the other circuit, so that since constant current is maintained the armature reaction will be varied by the variation in the number of turns of armature-winding which are included between each brush and the corresponding brush of the other circuit. There will be, therefore, a change in the magnetic flux threading the coils undergoing commutation, which will cause the commutation-currents in such coils to rise above or fall below their proper values, so that in either case sparks are produced at the moment the brushes leave the segments of such coils on the commutator.

My invention has for its object to provide automatic regulating mechanism by which such sparking will be greatly reduced or entirely prevented; and it consists, briefly, in a construction by which the span or effective reach of each brush may be varied to short-circuit a greater or less number of turns of the armature-winding, connections being provided between each rocker-arm and the span-adjusting mechanism of the brushes carried by the other rocker-arm whereby as either rocker-arm is shifted independent of the other, as in moving one set of brushes to compensate for a change of load on the corresponding circuit, the span of each brush will be changed to embrace a greater or less number of turns on the armature. The change in the reversing-field—that is, in the magnetic flux threading the short-circuited coils—is thus compensated for by the variation in the number of turns in such coils, so that the commutation-currents are maintained substantially at their proper values.

I will describe my invention particularly by reference to the accompanying drawings, in which—

Figure 12:
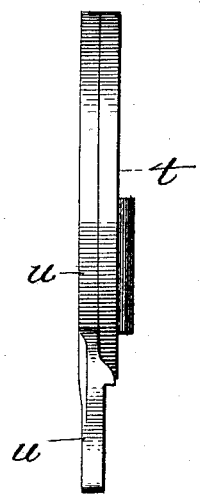
Figure 15:
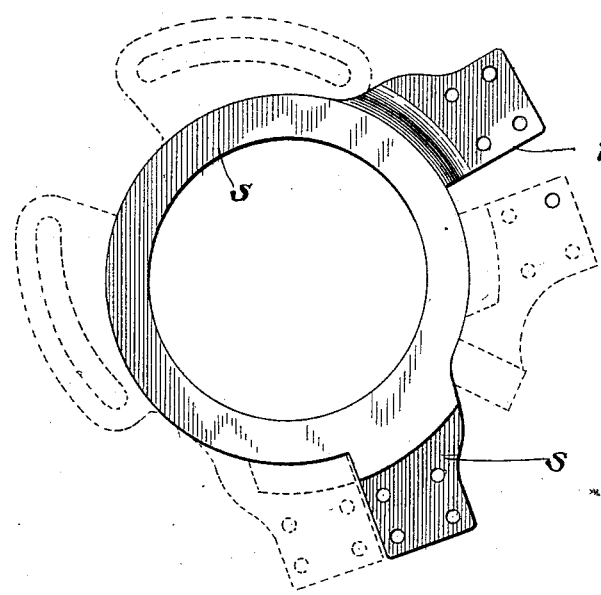
Figure 14:
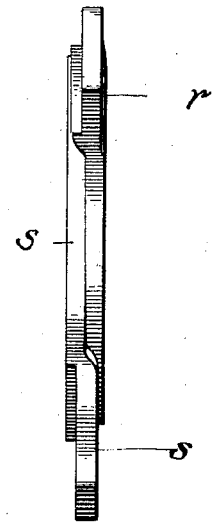

Figure 1 is a view in elevation of a multicircuit dynamo-electric machine constructed and equipped in accordance with my invention, some parts being broken away for clearness. Fig. 2 is an elevation of the brush-holding mechanism by which each of the two sets of brushes may be shifted and the span of each brush automatically adjusted to compensate for such shifting. Fig. 3 is a plan view of the two relatively movable brush-holders carrying the two members, respectively, which together constitute one of the four brushes of the machine. Fig. 4 is a front elevation of the parts shown in Fig. 3. Fig. 5 is a side view of the same. Fig. 6 is a detail sectional plan view of the two relatively movable brush-holders. Fig. 7 is a sectional plan view of the brush-holding mechanism shown in Fig. 2. Figs. 8 and 9 are detail views of the relatively stationary members of the two rocker-arms. Figs. 10 and 11 are transverse sectional views of the parts shown in Figs. 8 and 9, respectively. Fig. 12 is a detail edge view of the two rings which carry the movable members of one of the rocker-arms. Fig. 13 is a side view thereof, showing also in dotted lines the relatively stationary member of the rocker-arm which is illustrated in Fig. 8. Fig. 14 is an edge view of the two rings which carry the movable of the two rings which carry the movable members of the other rocker-arm, the stationary member whereof is illustrated in Fig. 9 and illustrated also in dotted lines in Fig. 15.

The same characters of reference are used to designate the same parts wherever they are shown.

Referring first to Fig. 1, the armature $a$ is arranged to rotate within the influence of the field-magnet $b$, which is provided with four poles $b'$ $b^2$ $b^3$ $b^4$. Two sets of brushes are provided for taking the current from said armature, each set of brushes supplying an individual constant-current circuit. The brushes $c\ d$, which are adjacent to pole-pieces $b'\ b^3$, respectively, supply the circuit 1, and the brushes $e\ f$, which are adjacent to pole-pieces $b^2\ b^4$, respectively, supply the circuit 2. As shown most clearly in Fig. 3, each brush consists of two parts or members $g\ h$. The member $h$ is mounted in a brush-holder $h'$, carried by one of the wooden arms $k$, which are fixed radially upon a relatively stationary member of the rocker. The other member $g$ of each brush is mounted in a brush-holder $g'$, carried by a wooden arm $k'$, which is fixed radially upon an independently-movable ring concentric with the other member of the rocker. By reference to Fig. 3 it will be seen that if the arms $k\ k'$ are moved apart the two members $g$ and $h$ of the brush will be moved in parallel planes to increase the effective span of the brushes—that is, to increase the distance between the left-hand edge of the brush $g$ and the right-hand edge of the brush $h$, so making the brush cover a greater number of the commutator-segments. The brushes shown are carbon brushes, and each member thereof is composite, being made up of two pieces of carbon. A heavy flexible conductor $l$ unites the brush-holders $g'$ and $h'$ of each brush, so that the two parts $g$ and $h$ constitute electrically a single brush, and by moving the arms $k$ and $k'$ the brush may be adjusted to cover a greater or less number of commutator-segments.

Referring now more particularly to Figs. 2 and 7, two rocker-rings $m\ o$ are provided, said rings screwing upon a threaded support $n$, which is mounted on the bearing. Either of these rockers may be rotated upon the threaded support $n$ independent of the other. The ring $m$ carries the parts which support brushes $e$ and $f$, and the ring $o$ carries the parts which support brushes $c$ and $d$. The relatively fixed member $p$ of the rocker-arm carrying brushes $e$ and $f$ is shown in detail in Figs. 9 and 11. This member $p$ is mounted concentrically upon the ring $m$ and has a threaded socket $p'$ therein, in which the threaded shank of a shifting handle $p^2$ is adapted to screw. When the handle is screwed in, the point $p^3$ thereof engages the ring $m$, so that the member $p$ and the ring $m$ are relatively locked to rotate together. The member $p$ may be adjusted at any time independent of the ring $m$ by loosening the screw-handle $p^2$ and then using the handle as a lever to shift said member $p$ concentrically upon said ring $m$. Normally, however, the member $p$ and the ring $m$ are locked to rotate together and are intended to be shifted only by the regulator $R^2$. As shown in Fig. 1, the regulator $R^2$, which is associated with the circuit 2, is connected by a link $m'$ with the ring $m$. The said regulator is of a type well known in the art and is adapted as the load on the circuit 2 changes to move the link $m'$ in one direction or the other, whereby the brushes $ef$, carried by the parts mounted upon the ring $m$, are shifted around the commutator. The regulator thus acts in a well-known way to shift the brushes $e$ and $f$ back and forth to maintain the current in circuit 2 constant independent of the load on such circuit. Similarly, the ring $o$, upon which the parts of the other rocker-arm carrying brushes $c$ and $d$ are mounted, is connected by a link $o'$ with the regulator $R'$, whereby the brushes $c$ and $d$ are shifted automatically to and fro by said regulator to compensate for changes of load on the circuit 1. The relatively stationary member $q$ of the rocker which carries brushes $c$ and $d$ has a threaded socket $q'$, adapted to receive the threaded shank of a rocker-handle similar to the rocker-handle $p^2$, whereby said member $q$ may be adjustably locked to rotate with the ring $o$. The arms $k\ k$, which project from the rocker $p$, carry the relatively fixed members $h\ h$ of the brushes $e$ and $f$, respectively. Two rings $r\ s$ are provided upon the ring $m$ for carrying the arms $k'\ k'$, which support the movable members of brushes $e$ and $f$. These rings are shown in detail in Figs. 14 and 15. Similarly, rings $t$ and $u$ (shown in detail in Figs. 12 and 13) are mounted to rotate upon the rocker-ring $o$ and carry the arms $k'\ k'$, which support the movable members of brushes $c$ and $d$. The arms $k'$ upon the relatively movable members of each rocker are connected by links $v\ v$ with cam-rollers, which constitute movable pivots upon the relatively stationary members of said rockers—that is to say, the members $p$ and $q$ (shown in Figs. 8, 9, 10, and 11) carry cam-plates $w\ w$, one at the base of each arm $k$. Each cam $w$ has a groove $w'$, in which the cam-roller $v'$, forming the pivot of the link $v$, connected to the other arm $k$, is adapted to move, the slots in said cam-plates being approximately radial. It will be seen that if the cam-rollers $v'$ are moved from the outer ends of the slots $w'$ to the inner ends thereof—that is, nearer to the axis of the armature-shaft—the links $v$ will draw the movable arms $k'$ close to the stationary arms $k$. The movement of the cam-rollers $v'$ to and fro in the slots $w'$ to adjust the arms $k'$ is produced by cam-plates $p^4\ p^5\ q^4\ q^5$, which are carried by the rockers $p$ and $q$. By reference to Fig. 2 it will be seen that if the rocker $q$ is shifted in a clockwise direction while the rocker $p$ is held stationary, or if the rocker $p$ is shifted in a contra-clockwise direction while the rocker $q$ is held stationary, the cam-rollers $v'\ v'$, which are engaged by the cam-plates $p^4$ and $q^4$, will be moved toward the inner ends of their slots $w'$, while simultaneously the cam-rollers which are engaged by the cam-plates $p^5\ q^5$ will be moved toward the outer ends of their slots, the result being that the arms carrying the two members of brushes $c$ and $e$ will be moved together, while the arms carrying the two members of brushes $d$ and $f$ will be moved apart.

To recapitulate, the movable arms $k'$ $k'$ of each rocker are connected, through cam-and-lever mechanism, with the relatively stationary member of the other rocker in such a way that when either rocker is moved independent of the other the span of all four brushes $c$ $d$ $e$ $f$ will be automatically changed, the mechanism being such that if either the two brushes $c$ and $e$ or the two brushes $d$ and $f$ are brought nearer together the span of each of the two brushes so brought nearer together is reduced, while the span of each of the two brushes which are moved apart is increased.

The operation of the machine is as follows: When the load on the circuit 1 is increased, the regulator $R'$ rotates the rocker which carries brushes $c$ and $d$ in a clockwise direction, Fig. 2. Similarly, if the load on circuit 2 is increased, the regulator $R^2$ shifts the rocker carrying brushes $e$ and $f$ in a clockwise direction. A decrease of the load on either circuit causes the regulator to move the corresponding rocker in a contra-clockwise direction. In Figs. 1 and 2 the brush-adjusting mechanism is shown in the condition it would be with no load on the circuit 1 and full load on the circuit 2. Whenever either rocker is shifted independent of the other in such a way that the two brushes $c$ and $e$ are brought nearer together, as would be the case if the rocker $p$ were moved in a contra-clockwise direction, Fig. 2, to compensate for a decrease in the load on circuit 2, the number of turns of armature-winding between the brushes so brought together would of course be decreased. The current being maintained practically constant, there would thus be a decrease in the armature reaction between the points where said brushes take off the current; because the number of ampere-turns on the armature between said brushes, and consequently the reactive magnetic field set up thereby, would be reduced. The magnetic flux from pole-pieces $b'$ and $b^2$ produced by the field-winding would thus be increased. This would tend to produce sparking, owing to the increase in the magnetic flux threading the short-circuited coils which are undergoing commutation; but by means of my invention the increase in the magnetic flux threading the short-circuited coils is compensated for by a decrease in the span of the brushes. As the brushes $c$ and $e$ are moved toward one another the cam-and-lever mechanism automatically brings the movable member of each of said brushes closer to the fixed member thereof, so that the number of commutator-segments spanned by each brush—that is, the portion of the armature-winding short-circuited by the brush—is reduced. Similarly, whenever brushes $c$ and $e$ or $d$ and $f$ are moved away from one another the consequent increase in the armature reaction between such brushes is compensated for by an increase in the span of each brush.

Having thus described my invention, I claim—

1. The combination with a multicircuit-generator having an armature, two sets of brushes for said armature, and an individual circuit fed from each set of brushes, of independently-movable rockers one for each set of brushes, a regulator for each circuit mechanically connected with a rocker carrying the brushes feeding that circuit, span-adjusting mechanism for each brush, and connections between each rocker and the span-adjusting mechanism of the other set of brushes, whereby the regulator of each circuit adjusts the other brushes to a position of sparkless commutation.

2. The combination with a multicircuit-generator having an armature, two sets of brushes for said armature and an individual circuit fed from each set of brushes, a rocker carrying each set of brushes, each brush consisting of two members, one member of each brush being fixed upon the corresponding rocker, a movable mounting for the other member of each brush, whereby the span of each brush may be adjusted, and lever mechanism connecting the mounting of the movable member of each brush with the rocker of the other set of brushes, whereby the effective reach of each brush is altered when either rocker is shifted independent of the other rocker.

3. The combination with a multicircuit-generator, of rockers $p$ $q$, each carrying fixed rocker-arms $k$ $k$, a brush-holder $h'$ carried by each of the arms $k$, an arm $k'$ associated with each arm $k$ and movable relatively thereto, a brush-holder $g'$ carried by each of the arms $k'$, each pair of brush-holders $g'$ $h'$ carrying the two members of a collecting-brush, a short-circuiting conductor $l$ electrically uniting the two members of each brush, coöperating cams on the respective rockers, and levers $v$ $v$ operated by said coöperating cams, uniting each movable arm $k'$ with the corresponding fixed arm, whereby the span of each brush is automatically adjusted when either rocker is shifted independent of the other.

In witness whereof I hereunto subscribe my name this 2d day of May, A. D. 1902.

HENRY H. WAIT.

Witnesses:
 DE WITT C. TANNER,
 W. W. LEACH.